United States Patent
Wang et al.

(10) Patent No.: US 10,914,680 B2
(45) Date of Patent: Feb. 9, 2021

(54) THREE-CHANNEL FLUORESCENCE LOCALIZATION SUPER-RESOLUTION BIOLOGICAL MICROSCOPE SYSTEM AND METHOD

(71) Applicant: Shenzhen Naguan Biotech Co., Ltd., Guangdong (CN)

(72) Inventors: Ying Wang, Zhejiang (CN); Daiying Xu, Zhejiang (CN); Shengwang Du, Zhejiang (CN); Luning Wang, Zhejiang (CN); Lujia Yu, Zhejiang (CN); Wen Qi, Zhejiang (CN)

(73) Assignee: Shenzhen Naguan Biotech Co., Ltd., Shenzhen (CN)

( * ) Notice: Subject to any disclaimer, the term of this patent is extended or adjusted under 35 U.S.C. 154(b) by 0 days.

(21) Appl. No.: 16/920,648

(22) Filed: Jul. 3, 2020

(65) Prior Publication Data
US 2020/0333249 A1 Oct. 22, 2020

Related U.S. Application Data

(63) Continuation of application No. PCT/CN2018/124734, filed on Dec. 28, 2018.

(51) Int. Cl.
*G02B 27/58* (2006.01)
*G01N 21/01* (2006.01)
(Continued)

(52) U.S. Cl.
CPC ......... *G01N 21/6428* (2013.01); *G01N 21/01* (2013.01); *G01N 21/6402* (2013.01);
(Continued)

(58) Field of Classification Search
CPC ........... G01N 21/6428; G01N 21/6402; G01N 21/01; G01N 2021/6439;
(Continued)

(56) References Cited

U.S. PATENT DOCUMENTS
2014/0158865 A1 6/2014 Cooper et al.

FOREIGN PATENT DOCUMENTS
CN 203350188 U 12/2013
CN 104062272 A 9/2014
(Continued)

OTHER PUBLICATIONS

Pan Leiting, Hu Fen, Zhang Xinzhening, Xu Jingng,Multicole Single-Molecule Localizáation Supper-Resolution Miceroscope. Acta Optica Sinica, 2017,vol. 37, No. 3, pp. 0318010-1-0318010-8.

*Primary Examiner* — Jennifer Wecker
*Assistant Examiner* — Michael Paul Shimek
(74) *Attorney, Agent, or Firm* — Wayne & Ken, LLC; Tony Hom

(57) ABSTRACT

A three-channel fluorescence localization super-resolution biological microscope system includes a microscope main body, an illumination module (2), an imaging module (3) and a three-dimensional nanoscale sample locking module (4). The illumination module (2) is used to realize three channels, wide-field and semi-total internal reflection illumination and total internal reflection illumination and is adjustable in an illumination mode. Illumination light generated by the illumination module (2) illuminates a sample through an objective lens. Fluorescent light emitted from the sample is allocated by a light splitter (8) of a fixed ratio after passing through a first multicolor reflector (6) and a front imaging lens (7), one part is allocated into the three-dimensional nanoscale sample locking module (4), and the remaining part is allocated into the imaging module. A three-channel fluorescence localization super-resolution biological microscope method is disclosed.

9 Claims, 4 Drawing Sheets

(51) Int. Cl.
*G01N 21/64* (2006.01)
*G02B 21/00* (2006.01)

(52) U.S. Cl.
CPC ....... *G02B 21/008* (2013.01); *G02B 21/0032* (2013.01); *G02B 21/0072* (2013.01); *G02B 21/0076* (2013.01); *G02B 27/58* (2013.01); *G01N 2021/6439* (2013.01); *G01N 2201/0633* (2013.01); *G01N 2201/06113* (2013.01)

(58) Field of Classification Search
CPC . G01N 2201/0633; G01N 2201/06113; G02B 27/58; G02B 21/0032; G02B 21/008; G02B 21/0072; G02B 21/0076
See application file for complete search history.

(56) References Cited

FOREIGN PATENT DOCUMENTS

| | | | |
|---|---|---|---|
| CN | 104089935 A | 10/2014 | |
| CN | 104122662 A | 10/2014 | |
| CN | 104515760 A | 4/2015 | |
| CN | 104678541 A | 6/2015 | |
| CN | 105136756 A | 12/2015 | |
| CN | 106094189 A | 11/2016 | |
| CN | 107014786 A | 8/2017 | |
| CN | 107525793 A | 12/2017 | |
| WO | 2013190327 A2 | 12/2013 | |
| WO | 2015153451 A1 | 10/2015 | |
| WO | WO-2016188143 A1 * | 12/2016 | ........... G02B 21/082 |

* cited by examiner

THREE-CHANNEL FLUORESCENCE LOCALIZATION SUPER-RESOLUTION BIOLOGICAL MICROSCOPE SYSTEM AND METHOD

CROSS-REFERENCE TO RELATED APPLICATIONS

This application is a continuation of International Patent Application No. PCT/CN2018/124734, filed on Dec. 28, 2018, which claims the benefit of priority from Chinese Patent Application No. 201810004948.2, filed on Jan. 3, 2018. The contents of the aforementioned application, including any intervening amendments thereto, are incorporated herein by reference in its entirety.

TECHNICAL FIELD

The present invention relates to the technical field of fluorescence localization microscopy, and particularly relates to a three-channel fluorescence localization super-resolution biological microscope system and method.

BACKGROUND OF THE PRESENT INVENTION

Since Ernst Abbe proposed the theory of optical imaging resolution limit in the 1770s, people have been looking for various methods to break through the resolution limit. At present, by using modern cutting-edge technologies, Xiaowei Zhuang and Eric Betzig successively proposed Stochastic Optical Reconstruction Microscopy (STORM) and Photoactivation Laser Microscopy (PALM) respectively in 2006, both of which have achieved super-resolution imaging breaking through ten times of the optical resolution limit. Eric Beziger won the 2014 Nobel Prize in Chemistry through this technology. At present, the PALM has already been partially commercialized, and has been applied to the basic life sciences, and especially to the research on the molecular biology and biochemistry. Through this technology, researchers can theoretically research detailed structures of biological samples with lateral resolution to 10-20 nm and vertical resolution to 50 nm.

However, the use of this principle in actual experiments encounters a lot of problems.

Firstly, sample drift is a common problem of a super-resolution fluorescence localization microscope. Thus refers to that the sample may move for tens to hundreds of nanometers in a photographing process due to the instability of the environment such as airflow, temperature change, noise, etc. Although the drift phenomenon is common in the microscope system, since the resolution of an ordinary microscope is less than 300 nm and the imaging time is short, the drift phenomenon is not apparent. However, for the super-resolution microscope with the resolution reaching tens of nanometers, the drift may cause severe interference with imaging.

Secondly, it is difficult to realize a multi-channel super-resolution fluorescence microscope. For realizing the multiple channels, if a sequential imaging method is used, the multiple channels utilizes laser of different wavelengths to excite fluorescent dyes for imaging according to a sequence, resulting in problems of long imaging time, low efficiency and difficulty in controlling the sample drift. The ultra-high imaging laser is high in intensity; when the imaging is performed for one channel, erroneous excitation of other channels will cause the quenching of the fluorescent dyes labeling the sample, resulting in insufficient labeling and affecting the imaging. Moreover, there will be certain degree of crosstalk among different channels, affecting the imaging accuracy.

Furthermore, STORM and PALM imaging requires the cooperation of fluorescent dye molecules and a component combination of an imaging buffer solution to produce a glittering effect under the irradiation of high laser, while the high-quality glittering requires a short bright time of the fluorescent molecules but more radiated photos, but different fluorescent dye molecules have different requirements for the components of the buffer solution when producing the high-quality glittering, that is to say, if more channels conduct super-resolution imaging, it is more difficult to find the cooperation of the fluorescent dye molecules and the components of the imaging buffer solution.

A method for solving the XY drift of the sample in the prior art is to use algorithms to rectify the drift or add fluorescent particles into the sample and record the displacement of these particles in the imaging and then to minus the displacement in the obtained super-resolution image. The method using the algorithms to rectify the drift has the disadvantage that the algorithm is not applicable to the sample with unclear structure, and only the linear drift of the sample can be rectified and nonlinear drift cannot be rectified. The method using the fluorescent particles to rectify the drift has the defects that the preparation is complicated, whether the fluorescent particles are already immobilized in the sample cannot be determined, and moreover, the fluorescent light of the fluorescent particles may be attenuated with the imaging time, so that the rectifying precision of the drift may also be worsened with the time. The method for controlling the sample drift in the longitudinal direction is a method using a beam of infrared rays or ultraviolet rays to solve the displacement through the reflection interference and actively moves the objective lens to compensate the displacement of the sample. This method has the defects that the imaging cannot be performed for deep cells, and if the sample radiates the infrared or ultraviolet rays, the running of a locking program may be affected.

The sequential imaging method is usually used to realize the multiple channels in the prior art, that is, the multiple channels utilize the laser of different wavelengths to excite the fluorescent dyes respectively for imaging according to a sequence. The sequential imaging method may cause the problems of long imaging time, low efficiency and difficulty in controlling the sample drift. The ultra-high imaging laser is high in intensity; and when the imaging is performed for one channel, the erroneous excitation of other channels will cause the quenching of the fluorescent dyes labeling the sample, resulting in insufficient labeling and affecting the imaging. Moreover, there will be certain degree of crosstalk among different channels, affecting the imaging accuracy.

China invention patent (2014107873615: a two-color fluorescence localization super-resolution biological microscope method and system) discloses a two-color fluorescence localization super-resolution biological microscope method. The method includes: performing two-color fluorescent labeling for a biological sample by using Alexa647 and Alexa750 fluorescent molecules, or Cy5 and Cy7 fluorescent molecules, and immersing the biological sample in an imaging buffer solution; illuminating the biological sample with laser to generate a first channel glittering fluorescent signal corresponding to the Alexa647 or Cy5 fluorescent molecules and a second channel glittering fluorescent signal corresponding to the Alexa750 or Cy7 fluorescent molecules; according to the first channel glittering fluorescent signal and the second channel glittering fluorescent signal, constructing a first biological structural super-resolution image and a second biological structural super-resolution image respectively; and aligning the first biological structural super-resolution image and the second biological structural super-resolution image to construct a third biological structural super-resolution image. The above imaging technical theory may not produce the channel crosstalk and may greatly reduce the background noise, but the method is a biological microscope imaging technology based on two channels, and has certain limitation for the imaging observation of the biological samples with diversified structures.

It can be seen from the above analysis that the high-quality three-channel fluorescence localization super-resolution biological microscope imaging cannot be realized in the prior art.

SUMMARY OF THE PRESENT INVENTION

Problems to be Solved by the Present Invention

1. A three-dimensional nanoscale stabilizing algorithm and system are used to solve the drift problem in a three-dimensional space during the fluorescence localization super-resolution microscope imaging process.

2. A method for simultaneously imaging with three channels and removing the inter-channel crosstalk with algorithms is used to solve the problems of the quenching of fluorescent dyes and the inter-channel crosstalk caused by long multi-channel fluorescence localization super-resolution biological imaging time and false excitation.

3. An appropriate ratio of three dyes and a buffer solution formula is found out, so that the dyes in three channels can be balanced in the buffer solution and can have high-quality glittering.

In order to overcome the problems in the prior art, the present invention provides a three-channel fluorescence localization super-resolution biological microscope system and method, which adopts a three-dimensional nanoscale stabilizing algorithm and system to lock a position of a sample in the ultrahigh image photographing process so as to solve the drift problem of the sample, can achieve locking accuracy of 2 nm in an XY direction and 20 nm in a Z direction, and can perform the imaging for deep cells. By adopting a method of simultaneously imaging with three channels and removing the inter-channel crosstalk with algorithms, the imaging time can be reduced by two times, and there is no crosstalk among the three channels.

In order to achieve the above purpose, a three-channel fluorescence localization super-resolution biological microscope system of the present invention comprises an objective lens, an imaging lens, an illumination module, an imaging module and a three-dimensional nanoscale sample locking module. The illumination module is used to realize three channels, wide-field and semi-total internal reflection illumination and total internal reflection illumination, and is adjustable in an illumination mode. Illumination light generated by the illumination module is reflected by a first multicolor reflector to illuminate a sample through the objective lens. Fluorescent light emitted from the sample is allocated by a light splitter after passing through the first multicolor reflector and a front imaging lens, one part is allocated into the three-dimensional nanoscale sample locking module, and the other part is allocated into the imaging module. The three-dimensional nanoscale sample locking module locks the position of the sample in the ultrahigh image photographing process. The imaging module allocates different bands of fluorescent light generated by a first channel, a second channel and a third channel into three different optical paths, and the fluorescent light of the three channels is imaged onto different positions of a detector chip.

After passing through a first collimating lens, a second multicolor reflector and an illumination lens, laser excited by the first channel and the second channel in the illumination module is reflected by the first multicolor reflector to illuminate the sample through the objective lens. After passing through a second collimating lens, a reflector, the second multicolor reflector and the illumination lens, the laser excited by the third channel in the illumination module is reflected by the first multicolor reflector to illuminate the sample through the objective lens.

The three-dimensional nanoscale sample locking module adopts a light emitting diode as a light-field light source to illuminate the sample through a Kohler illumination optical path. After passing through a microscope main body, one part (for example, 20%) is imaged on a locking camera, and a fourth filter is arranged between the allocation reflector (for example, a 20:80 reflector) and the locking camera. The three-dimensional nanoscale sample locking module utilizes a light emitting diode (for example, a 455-nm light emitting diode) different from the three-channel illumination light source to provide the light-field illumination to the sample through the Kohler illumination optical path. The light received by the objective lens from the sample is allocated by an allocation light splitter (for example a 20:80 light splitter), and one part (for example, 20%) of the light is imaged on the locking camera through the front imaging lens. The locking camera is connected with a computer, when a program of the computer is started, the program may capture a real-time image from the locking camera, and the program may calculate a local contrast of the image in real time and select an optimum area so as to adopt the area having a maximum sum of the local contrast as a position of an optimum area. The three-dimensional nanoscale sample locking module also comprises a piezoelectric ceramic platform, and when the locking is begun, the locking program may control the piezoelectric ceramic platform through a piezoelectric ceramic platform drive to scan up and down on a longitudinal focal plane. During the scanning, a calibration image sequence is captured from the locking camera, and a corresponding z value is recorded. The locking program intercepts a fixed-sized area from the uppermost or lowermost image of the calibration image sequence at the position of the optimum area as a reference image. A spatial correlation matrix is solved for the sequence image and the reference image, and Gaussian fitting is performed for the spatial correlation matrix. A monotone decrease correspondence between a fitting peak value and the z value is solved, and a multi-time function is used for approximate fitting. Subsequently, the locking program captures a light-field image of the sample in real time from the locking camera. A spatial correlation matrix is solved for a real-time image and the reference image, and is subjected to Gaussian fitting. A solved center position is used as an offset on the XY plane, and a real-time z value is solved by fitting the limit value. The locking program then drives the piezoelectric ceramic platform to compensate the offset through a drive circuit.

The imaging module comprises a rectangular diaphragm, an imaging collimating lens, three different optical paths, a reflector group, a rear imaging lens and a detector of an EMCCD or sCMOS camera. A first optical path of the three different optical paths comprises a first two-color reflector and a first filter. The second optical path comprises a second two-color reflector and a second filter. The third optical path comprises a third two-color reflector and a third filter.

Fluorescent light generated by exciting fluorescent dyes labeling the sample structure with laser is collected by the objective lens and proportioned by the allocation light splitter (for example, the 20:80 light splitter), one part (e.g. 80%) enters fluorescence simultaneous imaging optical paths of the three channels of the imaging module, an imaging range of the fluorescent light reaching the imaging module is firstly adjusted by the rectangular diaphragm, and the fluorescent light is collimated by the imaging collimating lens to become parallel light. The fluorescent light is formed by combining the fluorescent light of the three channels at the time. The first two-color reflector, the second two-color reflector and the third two-color reflector allocate the different bands of fluorescent light generated by the first channel, the second channel and the third channel into three different optical paths. The optical path of each channel has one filter, including the first filter in the first optical path, the second filter in the second optical path and the third filter in the third optical path. The first filter, the second filter and the third filter are used to filter excited light in the channels. The direction of the remaining fluorescent light is adjusted by the reflector group. Finally, the fluorescent light of the three channels is imaged onto different positions of the detector chip through the rear imaging lens.

In the super-resolution imaging process, the illumination light of the first channel, the second channel and the third channel simultaneously shines on the sample. When the illumination light is high in intensity, the fluorescent dyes of the three channels labeling the sample may glitter simultaneously to be imaged on different portions of the detector respectively through the imaging module. The detector may collect thousands to tens of thousands of original images with a fluorescent dye "glittering" signal and transmit same to the computer. The computer finds out a center position of each glittering point in each original image through Gaussian fitting and superimposes the center positions of the glittering points of all original images to obtain a ultrahigh-resolution image of the three channels.

The first channel generates the laser with a wavelength of 500 nm to 600 nm as the illumination light. The second channel generates the laser with the wavelength of 600 nm to 700 nm as the illumination light. The third channel generates the laser with the wavelength of 700 nm to 760 nm as the illumination light.

In order to further eliminate the impact of the inter-channel crosstalk on the imaging effect, the crosstalk removal algorithm is used to optimize an imaging result. The fluorescence imaging of each fluorescent dye on the three channels is measured, and the brightness on each channel is averaged to obtain a crosstalk ratio of the fluorescent dye on each channel. Since the amount of the light emitted by the fluorescent dyes is equal to the sum of the light amount received by each channel, the crosstalk ratio on each channel is normalized to obtain a light splitting ratio of the fluorescent dye on each channel. The crosstalk ratio of each single fluorescent dye is used as a column vector to be combined into a matrix, which is a crosstalk matrix of the fluorescence microscope system. An inverse matrix of the crosstalk matrix is the crosstalk-removed matrix. The images of each channel are lined into the column vector, and the crosstalk-removed matrix acts on the column vector formed by lining the images of each channel to obtain the crosstalk-removed image. The sequence of each channel corresponds to the sequence of each column of the crosstalk matrix.

The three-channel fluorescence localization super-resolution biological microscope system of the present invention adopts the fluorescent molecules of different excitation wavelengths to perform tri-color labeling for the biological sample, and the biological sample is immersed in an imaging buffer solution. The used three kinds of fluorescent molecules are fluorescent molecules having light switching properties and corresponding to laser with a wavelength of 500 nm to 600 nm, laser with the wavelength of 600 nm to 700 nm and the laser with the wavelength of 700 nm to 760 nm.

The imaging buffer solution contains TCEP, cyclooctatetraene, deoxidant, methyl viologen and/or ascorbic acid. The deoxidant comprises a combination of glucose oxidase, glucose and catalase or comprises a combination of pyranose oxidase, glucose and catalase. The used three types of fluorescent molecules are CF568 or Cy3B, Alexa 647 or Cy5, and Alexa750 or Cy7. The laser illuminates the biological sample to respectively generate a first channel glittering fluorescent signal corresponding to the Alexa647 or Cy5 fluorescent molecules, a second channel glittering fluorescent signal corresponding to the Alexa750 or Cy7 fluorescent molecules and a third channel glittering fluorescent signal corresponding to the CF568 or Cy3B fluorescent molecules.

The present invention also provides a microscope method of the three-channel fluorescence localization super-resolution biological microscope system, which comprises the following steps:

After passing through a first collimating lens, a second multicolor reflector and an illumination lens, laser excited by a first channel and a second channel in the illumination module is reflected by the first multicolor reflector to illuminate a sample through an objective lens. After passing through a second collimating lens, a reflector, the second multicolor reflector and the illumination lens, the laser excited by the third channel in the illumination module is reflected by the first multicolor reflector to illuminate the sample through the objective lens.

The three-dimensional nanoscale sample locking module is used to lock cells in real time, which comprises the following steps:

Step I: the three-dimensional nanoscale sample locking module utilizes a light emitting diode (e.g. a 455-nm light emitting diode) different from the illumination light source of the three channels to generate blue light to provide light-field illumination to the sample through a Kohler illumination optical path;

Step II: light received by an objective lens from the sample is allocated by an allocation light splitter (e.g. a 20:80 light splitter), and one part (e.g. 20%) of the light is imaged at a locking camera through a front imaging lens;

Step III: when a program of the computer is started, the program may capture a real-time image from the locking camera;

Step IV: the program may calculate a local contrast of the image in real time, and select an optimum area so as to use the area having a maximum sum of the local contrast as a position of the optimum area;

Step V: when the locking is begun, the locking program may control a piezoelectric ceramic platform through a piezoelectric ceramic platform drive to longitudinally scan a focal plane up and down; and during the scanning, a calibration image sequence is captured from the locking camera and the corresponding z value is recorded;

Step VI: the locking program intercepts a fixed-sized area from the uppermost or lowermost image of the calibration image sequence at the optimum area position as a reference image;

Step VII: a spatial correlation matrix is solved for the sequence image and the reference image, and the Gaussian fitting is carried out for the spatial correlation matrix;

Step VIII: a monotone decrease correspondence between a fitting peak value and the z value is solved, and a multi-time function is used for approximate fitting;

Step IX: the locking program then captures a light-field image of the sample in real time from the locking camera;

Step X: the spatial correlation matrix is solved for the real-time image and the reference image and is subjected to the Gaussian fitting, a center is solved as an offset on an xy plane, and a real-time z value is solved by fitting the limit value;

Step XI: the locking program then drives the piezoelectric ceramic platform to compensate the offset through a drive circuit; and Step XII: step VIII and step X are repeated until the locking is ended.

The fluorescent light generated by exciting fluorescent dyes labeling the sample structure with the laser is collected by the objective lens and proportioned by the allocation light splitter (e.g. the 20:80 light splitter), one part (e.g. 80%) enters the fluorescent simultaneous imaging optical paths of the three channels of the imaging module, an imaging range of the fluorescent light reaching the imaging module is firstly adjusted by the rectangular diaphragm, and the fluorescent light is collimated by the imaging collimating lens to become parallel light. The fluorescent light is formed by combining the fluorescent light of the three channels at the time. The first two-color reflector, the second two-color reflector and the third two-color reflector allocate different bands of fluorescent light generated by the first channel, the second channel and the third channel into three different optical paths. The optical path of each channel has one filter, including the first filter in the first optical path, the second filter in the second optical path and the third filter in the third optical path. The first filter, the second filter and the third filter are used to filter the excited light in the channels. The direction of the remaining fluorescent light is adjusted by the reflector group. Finally, the fluorescent light of the three channels is imaged onto different positions of the detector chip through the rear imaging lens.

In order to further eliminate the impact of the inter-channel crosstalk on the imaging effect, a crosstalk removal algorithm is used to optimize an imaging result. The fluorescence imaging of each fluorescent dye on the three channels is measured, and the brightness on each channel is averaged to obtain a crosstalk ratio of the fluorescent dye on each channel. Since the amount of the light emitted by the fluorescent dye is equal to the sum of the light amount received by each channel, the crosstalk ratio on each channel is normalized to obtain a light splitting ratio of the fluorescent dye on each channel. The crosstalk ratio of each single fluorescent dye is used as a column vector to be combined into a matrix, which is a crosstalk matrix of the fluorescence microscope system. An inverse matrix of the crosstalk matrix is the crosstalk-removed matrix. The images of each channel are lined into the column vector, and the crosstalk-removed matrix is used to act on the column vector formed by lining the images of each channel to obtain the crosstalk-removed image. The sequence of each channel corresponds to the sequence of each column of the crosstalk matrix.

The present invention has the following advantages: compared with the prior art, the three-channel fluorescence localization super-resolution biological microscope system adopts the three-dimensional nanoscale stabilizing algorithm and system to lock the position of the sample in the ultrahigh image photographing process so as to solve the drift problem of the sample, which can achieve the locking accuracy of 2 nm in an XY direction and 20 nm in a Z direction, and can perform the imaging for deep cells in the locking process. By adopting the method of simultaneously imaging with three channels and removing the inter-channel crosstalk with the algorithm, the imaging time can be reduced by two times, and there is no crosstalk among the three channels.

The present invention can realize the resolution of 20 nm in the xy direction and 50 nm in the z direction with the three channels. The imaging is simultaneously carried out for the three channels, so that the imaging time is shortened by two times, and there is no crosstalk among the channels. The sample drift in the imaging process can be controlled at 2 nm in the xy direction and about 20 nm in the z direction.

The present invention adopts the three-dimensional nanoscale sample locking system to solve the sample drift problem in the imaging process and can perform the imaging for the deep cells in the sample locking process.

The present invention improves the multi-channel super-resolution fluorescence localization microscope imaging method, and adopts a three-channel simultaneous imaging method and utilizes the crosstalk removal algorithm, thereby shortening the imaging time by two times, and preventing the crosstalk among the channels.

The fluorescent dyes used in the present invention achieve a balanced and high-quality "glittering effect" in the buffer solution used in the present invention.

Other three-channel super-resolution imaging technologies in the prior art use different excitation wavelengths which are generally 488 nm, 561 nm and 647 nm, so that the selection of the fluorescent molecules and the proportion of the imaging buffer solution are different from the technology of the present invention. The technology of the present invention selects the wavelengths of 500 nm to 600 nm, 600 nm to 700 nm and 700 nm to 760 nm as combinations of the three channels, combines the appropriate fluorescent dyes according to the requirements that the fluorescent dyes have the glittering properties and the optical chemical performance of the three types of fluorescent molecules is balanced, and optimizes the imaging buffer solution. In combination with other technologies of the present invention, the simultaneous imaging of the three channels is ensured, and the resolution of 20 nm in the xy direction and 50 nm in the z direction of the three channels can be realized.

DETAILED DESCRIPTION OF THE PRESENT INVENTION

Figure 1:
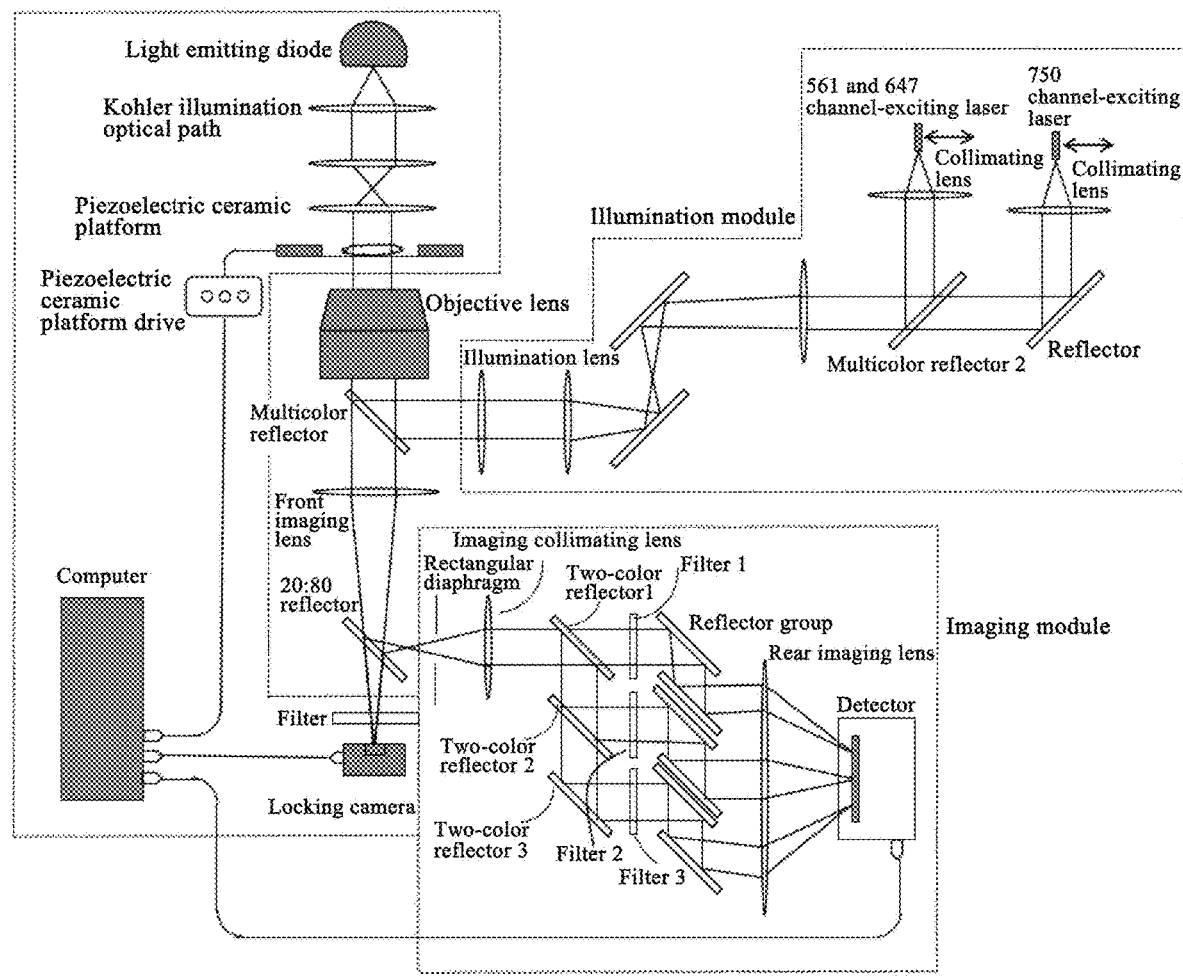
FIG. 1 is a structural schematic diagram of a three-channel fluorescence localization super-resolution biological microscope system of the present invention.
Figure 2:
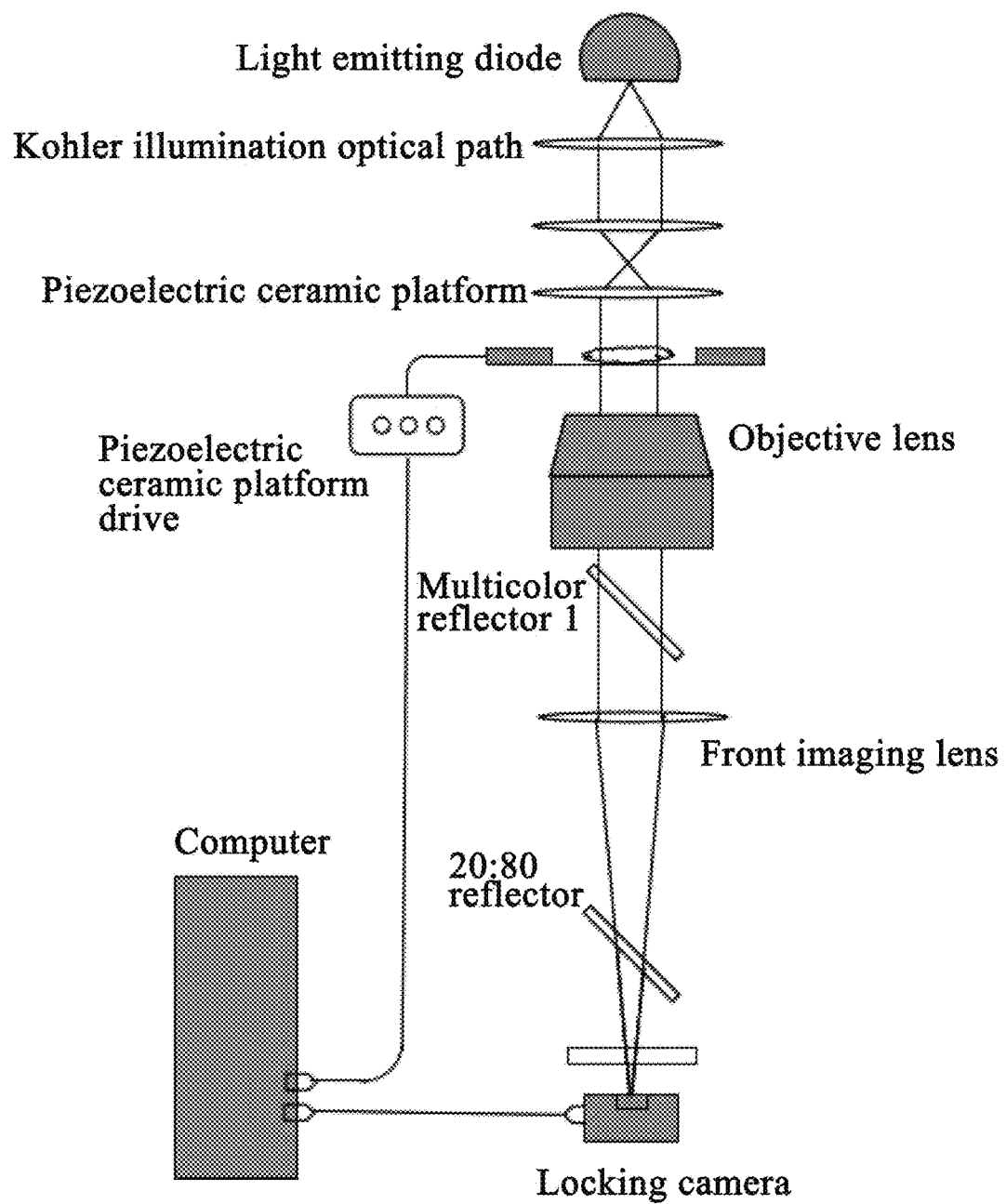
FIG. 2 is a structural schematic diagram of a three-dimensional nanoscale sample locking module of the present invention.

The following embodiments are used to describe the present invention but not to limit the scope of the present invention.

A three-channel fluorescence localization super-resolution biological microscope system of the present invention includes an objective lens, an imaging lens, an illumination module 2, an imaging module 3 and a three-dimensional nanoscale sample locking module 4. The illumination module is used to realize three channels of 561 nm, 647 nm and 750 nm (i.e. a first channel, a second channel and a third channel), wide-field and semi-total internal reflection illumination and total internal reflection illumination, and is adjustable in an illumination mode. Illumination light generated by the illumination module is reflected by a first multicolor reflector 6 to illuminate a sample 51 through the objective lens 5. Fluorescent light emitted from the sample is allocated by a 20:80 light splitter 8 (allocation light splitter) after passing through the first multicolor reflector 6 and a front imaging lens 7, 20% is allocated into the three-dimensional nanoscale sample locking module, and 80% is allocated into the imaging module. The three-dimensional nanoscale sample locking module locks the position of the sample in the ultrahigh image photographing process. The imaging module allocates different bands of fluorescent light generated by the 561-nm channel, the 647-nm channel and the 750-nm channel (i.e. the first channel, the second channel and the third channel) into three different optical paths, and the fluorescent light of the three channels is imaged onto different positions of a detector chip.

After passing through a first collimating lens 23, a second multicolor reflector 25 and an illumination lens 27, laser excited by the 561-nm channel and the 647-nm channel 21 (i.e. the first channel and the second channel) in the illumination module is reflected by the first multicolor reflector 6 to illuminate the sample through the objective lens 5. After passing through a second collimating lens 24, a reflector 26, a second multicolor reflector 25 and an illumination lens 27, the laser excited by the 750-nm channel 22 (i.e. the third channel) in the illumination module is reflected by the first multicolor reflector 6 to illuminate the sample through the objective lens 5.

Figure 3:
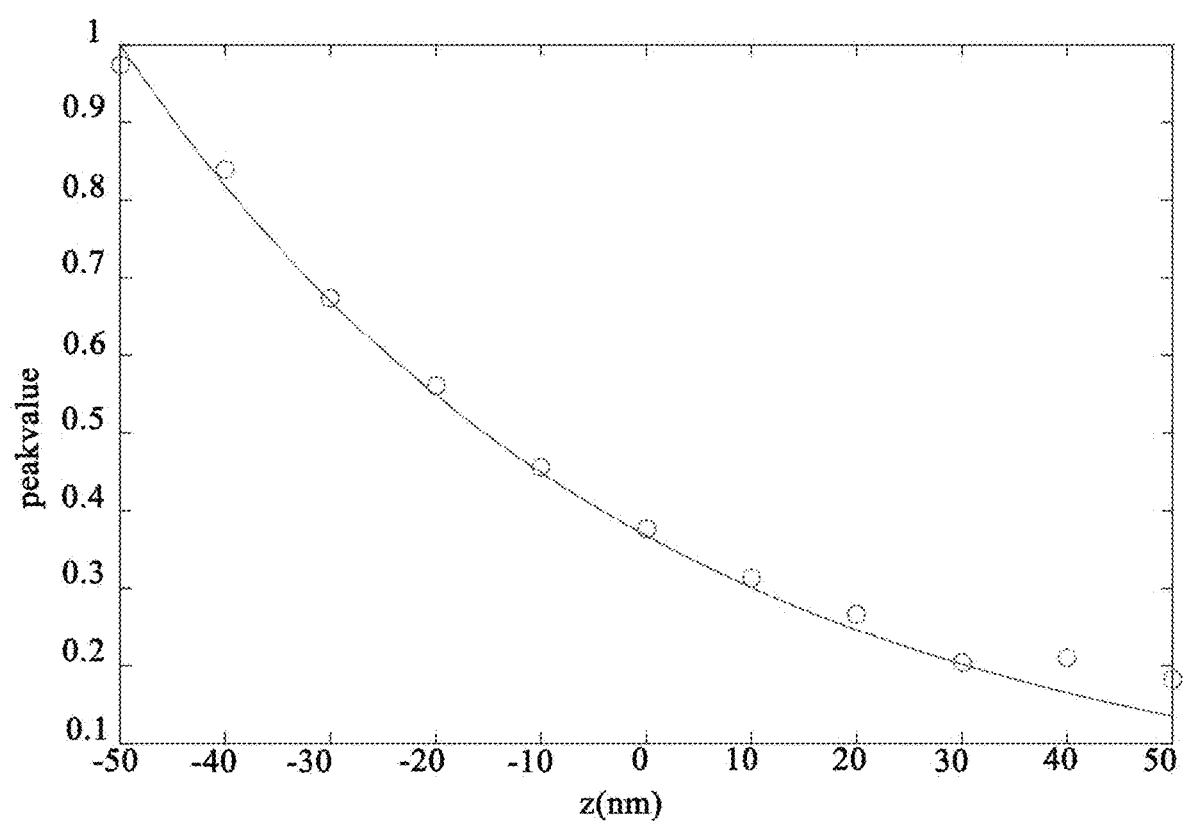
FIG. 3 is a schematic diagram of a monotone decrease correspondence between a fitting peak value and a z value.
Figure 4:
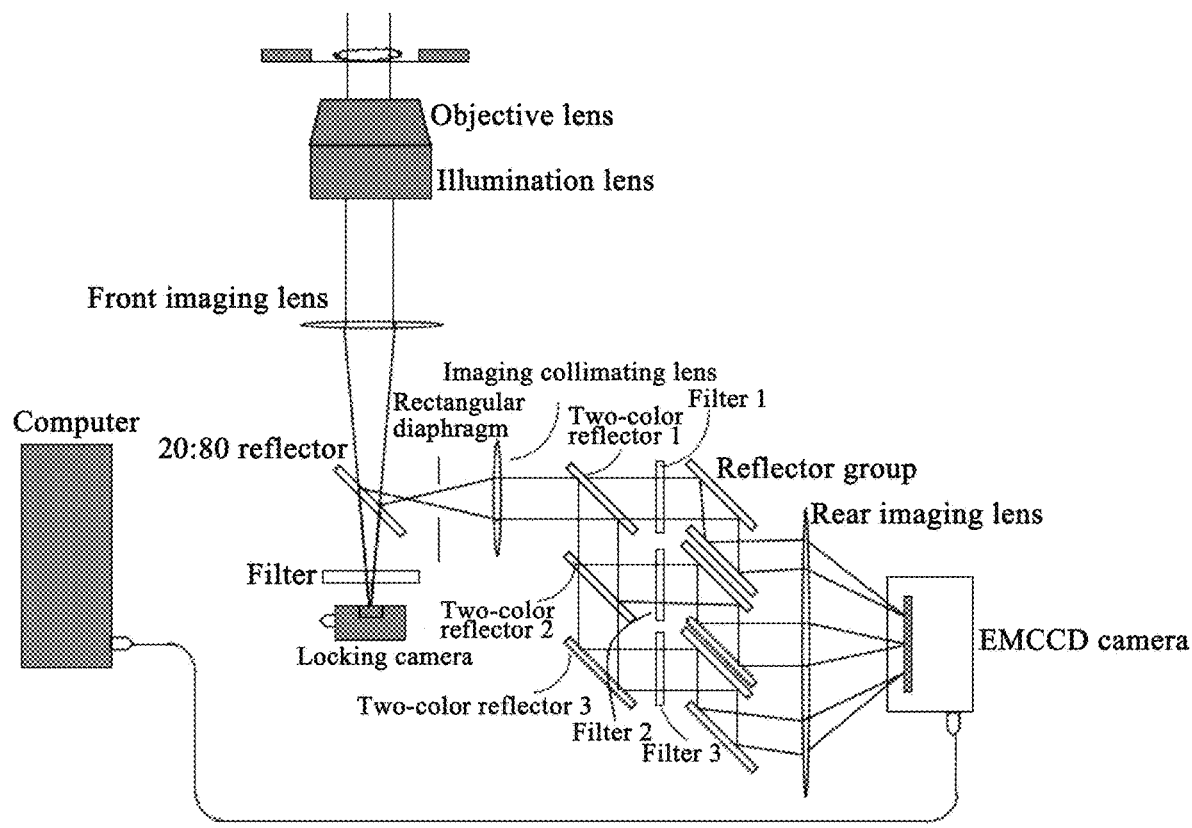
FIG. 4 is a schematic diagram of simultaneous imaging of three channels of the present invention.

The three-dimensional nanoscale sample locking module adopts a 455-nm light emitting diode 41 (a light emitting diode different from the illumination light source of the three channels) as a light-field light source to illuminate the sample through a Kohler illumination optical path 42. After passing through a microscope main body, 20% of the light-field light is imaged on a locking camera 10, and a fourth filter 9 is arranged between the 20:80 light splitter 8 and the locking camera 10. The three-dimensional nanoscale sample locking module utilizes the 455-nm light emitting diode to generate blue light to provide the light-field illumination to the sample through the Kohler illumination optical path 42. The light received by the objective lens 5 from the sample is allocated by the 20:80 allocation light splitter 8, and 20% of the light is imaged on the locking camera 10 through the front imaging lens. The locking camera is connected with a computer 45, when a program of the computer is started, the program may capture a real-time image from the locking camera, and the program may calculate a local contrast of the image in real time and select an optimum area so as to adopt the area having a maximum sum of the local contras as an optimum area. The three-dimensional nanoscale sample locking module also includes a piezoelectric ceramic platform 43, and when the locking is begun, the locking program may control the piezoelectric ceramic platform through a piezoelectric ceramic platform drive to scan up and down on a longitudinal focal plane (for example, 1 micrometer up and down respectively). During the scanning, a calibration image sequence is captured from the locking camera, and a corresponding z value is recorded. The locking program intercepts a fixed-sized area from the uppermost or lowermost image of the calibration image sequence at the position of the optimum area as a reference image. A spatial correlation matrix is solved for the sequence image and the reference image, and Gaussian fitting is performed for the spatial correlation matrix. A monotone decrease correspondence between the fitting peak and the z value is solved, and a multi-time function is used for approximate fitting (as shown in FIG. 3). The locking program then captures a light-field image of the sample in real time from the locking camera. A spatial correlation matrix is solved for the real-time image and the reference image, and is subjected to the Gaussian fitting. A solved center position is used as an offset on the XY plane, and a real-time z value is solved by fitting the limit value. The locking program then drives the piezoelectric ceramic platform to compensate the offset through a drive circuit.

The imaging module includes a rectangular diaphragm 30, an imaging collimating lens 31, three different optical paths, a reflector group 38, a rear imaging lens 39 and a detector 301 of an EMCCD or sCMOS camera. A first optical path of the three different optical paths includes a first two-color reflector 32 and a first filter 35. The second optical path includes a second two-color reflector 33 and a second filter 36. The third optical path includes a third two-color reflector 34 and a third filter 37.

Fluorescent light generated by exciting fluorescent dyes labeling the sample structure with the laser is collected by the objective lens, and proportioned by the 20:80 light splitter, 80% enters fluorescent simultaneous imaging optical paths of the three channels of the imaging module, an imaging range of the fluorescent light reaching the imaging module is firstly adjusted by the rectangular diaphragm (an imaging area is selected), and the fluorescent light is collimated by the imaging collimating lens to become parallel light. The fluorescent light is formed by combining the fluorescent light of the three channels at the time. The first two-color reflector 32, the second two-color reflector 33 and the third two-color reflector 34 allocate different wavebands of fluorescent light generated by the 561-nm channel, the 647-nm channel and the 750-nm channel (i.e. the first channel, the second channel and the third channel) into three different optical paths. The optical path of each channel has one filter, including the first filter 35 in the first optical path, the second filter 36 in the second optical path and the third filter 37 in the third optical path. The first filter 35, the second filter 36 and the third filter 37 are used to filter excited light in the channels. The direction of the remaining fluorescent light is adjusted by the reflector group. Finally, the fluorescent light of the three channels is imaged onto different positions of the detector chip through the rear imaging lens.

In the super-resolution imaging process, the illumination light of the 561-nm channel, the 647-nm channel and the 750-nm channel (i.e. the first channel, the second channel and the third channel) simultaneously illuminates the sample. When the illumination light is high in intensity, the fluorescent dyes labeling the three channels of the sample may glitter simultaneously to be imaged on different portions of the detector respectively through the imaging module. The detector may collect thousands to tens of thousands of original images with a fluorescent dye "glittering" signal and transmit same to the computer. The computer finds out a center position of each glittering point in each original image through Gaussian fitting and superimposes the center positions of the glittering points of all original images to obtain a super-resolution image of the three channels.

In the above preferred embodiments, the first channel is the 561-nm channel, the second channel is the 647-nm channel, and the third channel is the 750-nm channel, but for those skilled in the art, it should be understood that the channels are not limited to the above numerical values. The first channel can generate the laser with a wavelength of 500 nm to 600 nm as the illumination light. The second channel can generate the laser with the wavelength of 600 nm to 700 nm as the illumination light. The third channel can generate the laser with the wavelength of 700 nm to 760 nm as the illumination light.

In order to further eliminate the impact of the inter-channel crosstalk on the imaging effect, a crosstalk removal algorithm is used to optimize an imaging result. The principle of the crosstalk removal algorithm is as follows: (1) the fluorescence imaging of each fluorescent dye on three channels is measured, and the brightness on each channel is averaged to obtain a crosstalk ratio of the fluorescent dyes on each channel. (2) Since the amount of the light emitted by the fluorescent dyes is equal to a sum of the light amount received by each channel, the crosstalk ratio on each channel is normalized to obtain a light splitting ratio of the fluorescent dyes on each channel. (3) The crosstalk ratio of each single fluorescent dye is used as a column vector to be combined into a matrix, which is a crosstalk matrix of the fluorescence microscope system. (4) An inverse matrix of the crosstalk matrix is the crosstalk-removed matrix. (5) The images of each channel are lined into the column vector, and then the crosstalk-removed matrix is used to act on the column vector to obtain a crosstalk-removed image. The sequence of each channel corresponds to the sequence of each column of the crosstalk matrix.

The three-channel fluorescence localization super-resolution biological microscope system of the present invention adopts the fluorescent molecules of different excitation wavelengths to perform three-color labeling for the biological sample, and the biological sample is immersed in an imaging buffer solution. The used three types of fluorescent molecules are fluorescent molecules having light switching properties and corresponding to the laser with a wavelength of 500 nm to 600 nm, the laser with the wavelength of 600 nm to 700 nm and the laser with the wavelength of 700 nm to 760 nm.

The imaging buffer solution contains TCEP, cyclooctatetraene, deoxidant, methyl viologen and/or ascorbic acid. The deoxidant comprises a combination of glucose oxidase, glucose and catalase or comprises a combination of pyranose oxidase, glucose and catalase. The used three types of fluorescent molecules are CF568 or Cy3B, Alexa 647 or Cy5, and Alexa750 or Cy7. The laser illuminates the biological sample to respectively generate a first channel glittering fluorescent signal corresponding to Alexa647 or Cy5 fluorescent molecule, a second channel glittering fluorescence signal corresponding to the Alexa750 or Cy7 fluorescent molecules and a third channel glittering fluorescent signal corresponding to CF568 or Cy3B fluorescent molecules.

The imaging buffer solution used in the present invention provides a chemical environment for the ultrahigh-resolution imaging of the fluorescent molecules: (1) a reducing agent provides chemical groups for the glittering; and (2) the photobleaching of the deoxidant in the imaging process is greatly reduced.

The present invention also provides a microscope method of the three-channel fluorescence localization super-resolution biological microscope system, which includes the following steps:

After passing through a first collimating lens, a second multicolor reflector and an illuminating lens, laser excited by a 561-nm channel and a 647-nm channel in an illumination module is reflected by a first multicolor reflector to illuminate a sample through an objective lens. After passing through a second collimating lens, a reflector, a second multicolor reflector and the illuminating lens, the laser excited by a 750-nm channel in the illumination module is reflected by the first multicolor reflector to illuminate the sample through the objective lens.

A three-dimensional nanoscale sample locking module is used to lock cells in real time, which includes the following steps:

Step I: the three-dimensional nanoscale sample locking module utilizes a 455-nm light emitting diode to generate blue light to provide light-field illumination to the sample through a Kohler illumination optical path.

Step II: light received by an objective lens from the sample is allocated by a 20:80 light splitter, and 20% of the light is imaged at a locking camera through a front imaging lens;

Step III: when a program of the computer is started, the program may capture a real-time image from the locking camera;

Step IV: the program may calculate a local contrast of the image in real time, and select an optimum area so as to use the area having a maximum sum of the local contrast as a position of the optimum area;

Step V: when the locking is begun, the locking program may control a piezoelectric ceramic platform through a piezoelectric ceramic platform drive to scan up and down on a longitudinal focal plane; and during the scanning, a calibration image sequence is captured from the locking camera, and a corresponding z value is recorded;

Step VI: the locking program intercepts a fixed-sized area from the uppermost or lowermost image of the calibration image sequence at the optimum area position as a reference image;

Step VII: a spatial correlation matrix is solved for the sequence image and the reference image, and the Gaussian fitting is carried out for the spatial correlation matrix;

Step VIII: a monotone decrease correspondence between a fitting peak value and the z value is solved, and a multi-time function is used for approximate fitting;

Step IX: the locking program then captures a light-field image of the sample in real time from the locking camera;

Step X: a spatial correlation matrix is solved for the real-time image and the reference image, and is subjected to Gaussian fitting, a solved center position is used as an offset on an xy plane, and the real-time z value is solved by fitting the limit value;

Step XI: the locking program then drives the piezoelectric ceramic platform to compensate the offset through a drive circuit; and Step XII: step VIII and step X are repeated until the locking is ended.

Fluorescent light generated by exciting the fluorescent dyes labeling the sample structure with the laser is collected by the objective lens, and proportioned by the 20:80 light splitter, 80% enters fluorescent simultaneous imaging optical paths of the three channels of the imaging module, an imaging range of the fluorescent light reaching the imaging module is firstly adjusted by the rectangular diaphragm, and the fluorescent light is collimated by the imaging collimating lens to become parallel light. The fluorescent light is formed by combining the fluorescent light of the three channels at the time. The first two-color reflector, the second two-color reflector and the third two-color reflector allocate different wavebands of fluorescent light generated by the 561-nm channel, the 647-nm channel and the 750-nm channel into three different optical paths. The optical path of each channel has one filter, including the first filter in the first optical path, the second filter in the second optical path and the third filter in the third optical path. The first filter, the second filter and the third filter are used to filter excited light in the channels. The direction of the remaining fluorescent light is adjusted by the reflector group. Finally, the fluorescent light of the three channels is imaged onto different positions of the detector chip through the rear imaging lens.

In order to further eliminate the impact of the interchannel crosstalk on the imaging effect, a crosstalk removal algorithm is used to optimize an imaging result. The fluorescence imaging of each fluorescent dye on the three channels is measured, and the brightness on each channel is averaged to obtain a crosstalk ratio of the fluorescent dye on each channel. Since the amount of the light emitted by the fluorescent dye is equal to the sum of the light amount received by each channel, the crosstalk ratio on each channel is normalized to obtain a light splitting ratio of the fluorescent dye on each channel. The crosstalk ratio of each single fluorescent dye is used as a column vector to be combined into a matrix, i.e. a crosstalk matrix of the fluorescence microscope system. An inverse matrix of the crosstalk matrix is the crosstalk-removed matrix. The images of each channel are lined into the column vector, and the crosstalk-removed matrix is then used to act on the column vector formed by lining the images of each channel to obtain the crosstalk-removed image. The sequence of each channel corresponds to the sequence of each column of the crosstalk matrix.

The preferred embodiments of the present invention are described in detail above, but the present invention is not limited to the above-mentioned embodiments, and various changes can be made without departing from the tenet of the present invention within the scope of knowledge of those skilled in the art. These changes involve relevant technologies well known to those skilled in the art, and all fall within the protection scope of the present invention.

Many other changes and modifications may also be made without departing from the concept and scope of the present invention. It should be understood that the present invention is not limited to the specific embodiment, and the scope of the present invention is defined by appended claims.

What is claimed is:

1. A three-channel fluorescence localization super-resolution biological microscope system, comprising an objective lens, an imaging lens, an illumination module, an imaging module and a three-dimensional nanoscale sample locking module, wherein the illumination module is used to realize three channels, wide-field and semi-total internal reflection illumination and total internal reflection illumination, and is adjustable in an illumination mode; illumination light generated by the illumination module is reflected by a first multicolor reflector to illuminate a sample through the objective lens; fluorescent light emitted from the sample is allocated by a light splitter after passing through the first multicolor reflector and a front imaging lens, one part is allocated into the three-dimensional nanoscale sample locking module, and the other part is allocated into the imaging module; the three-dimensional nanoscale sample locking module locks the position of the sample in the ultrahigh image photographing process; the imaging module allocates different bands of fluorescent light generated by a first channel, a second channel and a third channel into three different optical paths, and the fluorescent light of the three channels is imaged onto different positions of a detector chip;

the three-dimensional nanoscale sample locking module adopts a light emitting diode different from the three-channel illumination light source as a light-field light source to illuminate the sample through a Kohler illumination optical path; after passing through a microscope main body, one part is imaged on a locking camera, and a fourth filter is arranged between the allocation reflector and the locking camera; the three-dimensional nanoscale sample locking module utilizes a light emitting diode different from the three-channel illumination light source to provide the light-field illumination to the sample through the Kohler illumination optical path; the light received by the objective lens from the sample is allocated by an allocation light splitter, and one part of the light is imaged on the locking camera through the front imaging lens; the locking camera is connected with a computer; when a program of the computer is started, the program may capture a real-time image from the locking camera, and the program may calculate a local contrast of the image in real time and select an optimum area so as to adopt the area having a maximum sum of the local contrast as a position of an optimum area; the three-dimensional nanoscale sample locking module also comprises a piezoelectric ceramic platform, and when the locking is begun, the locking program may control the piezoelectric ceramic platform through a piezoelectric ceramic platform drive to scan up and down on a longitudinal focal plane; during the scanning, a calibration image sequence is captured from the locking camera, and a corresponding z value is recorded; the locking program intercepts a fixed-sized area from the uppermost or lowermost image of the calibration image sequence at the position of the optimum area as a reference image; a spatial correlation matrix is solved for the sequence image and the reference image, and Gaussian fitting is performed for the spatial correlation matrix; a monotone decrease correspondence between a fitting peak value and the z value is solved, and a multi-time function is used for approximate fitting; subsequently, the locking program captures a light-field image of the sample in real time from the locking camera; a spatial correlation matrix is solved for a real-time image and the reference image, and is subjected to Gaussian fitting; a solved center position is used as an offset on the XY plane, and a real-time z value is solved by fitting the limit value; and the locking program then drives the piezoelectric ceramic platform to compensate the offset through a drive circuit.

2. The three-channel fluorescence localization super-resolution biological microscope system according to claim 1, wherein after passing through a first collimating lens, a second multicolor reflector and an illumination lens, laser excited by the first channel and the second channel in the illumination module is reflected by the first multicolor reflector to illuminate the sample through the objective lens;

and after passing through a second collimating lens, a reflector, the second multicolor reflector and the illumination lens, the laser excited by the third channel in the illumination module is reflected by the first multicolor reflector to illuminate the sample through the objective lens.

3. The three-channel fluorescence localization super-resolution biological microscope system according to claim 1, wherein the imaging module comprises a rectangular diaphragm, an imaging collimating lens, three different optical paths, a reflector group, a rear imaging lens and a detector of an EMCCD or sCMOS camera; a first optical path of the three different optical paths comprises a first two-color reflector and a first filter; the second optical path comprises a second two-color reflector and a second filter; and the third optical path comprises a third two-color reflector and a third filter.

4. The three-channel fluorescence localization super-resolution biological microscope system according to claim 3, wherein fluorescent light generated by exciting fluorescent dyes labeling the sample structure with laser is collected by the objective lens and proportioned by the allocation light splitter, one part enters fluorescence simultaneous imaging optical paths of the three channels of the imaging module, an imaging range of the fluorescent light reaching the imaging module is firstly adjusted by the rectangular diaphragm, and the fluorescent light is collimated by the imaging collimating lens to become parallel light; the fluorescent light is formed by combining the fluorescent light of the three channels at the time; the first two-color reflector, the second two-color reflector and the third two-color reflector allocate the different bands of fluorescent light generated by the first channel, the second channel and the third channel into three different optical paths; the optical path of each channel has one filter, comprising the first filter in the first optical path, the second filter in the second optical path and the third filter in the third optical path; the first filter, the second filter and the third filter are used to filter excited light in the channels; the direction of the remaining fluorescent light is adjusted by the reflector group; finally, the fluorescent light of the three channels is imaged onto different positions of the detector chip through the rear imaging lens; in the super-resolution imaging process, the illumination light of the first channel, the second channel and the third channel simultaneously shines on the sample; when the illumination light is high in intensity, the fluorescent dyes of the three channels labeling the sample may "glitter" simultaneously to be imaged on different portions of the detector respectively through the imaging module; the detector may collect thousands to tens of thousands of original images with a fluorescent dye "glittering" signal and transmit same to the computer; the computer finds out a center position of each glittering point in each original image through Gaussian fitting and superimposes the center positions of the glittering points of all original images to obtain a ultrahigh-resolution image of the three channels.

5. The three-channel fluorescence localization super-resolution biological microscope system according to claim 4, wherein the first channel generates the laser with a wavelength of 500 nm to 600 nm as the illumination light; the second channel generates the laser with the wavelength of 600 nm to 700 nm as the illumination light; and the third channel generates the laser with the wavelength of 700 nm to 760 nm as the illumination light.

6. The three-channel fluorescence localization super-resolution biological microscope system according to claim 5, wherein in order to further eliminate the impact of the inter-channel crosstalk on the imaging effect, the crosstalk removal algorithm is used to optimize an imaging result; the fluorescence imaging of each fluorescent dye on the three channels is measured; the brightness on each channel is averaged to obtain a crosstalk ratio of the fluorescent dye on each channel; since the amount of the light emitted by the fluorescent dyes is equal to the sum of the light amount received by each channel, the crosstalk ratio on each channel is normalized to obtain a light splitting ratio of the fluorescent dye on each channel; the crosstalk ratio of each single fluorescent dye is used as a column vector to be combined into a matrix, which is a crosstalk matrix of the fluorescence microscope system; an inverse matrix of the crosstalk matrix is the crosstalk-removed matrix; the images of each channel are lined into the column vector, and the crosstalk-removed matrix acts on the column vector formed by lining the images of each channel to obtain the crosstalk-removed image; and the sequence of each channel corresponds to the sequence of each column of the crosstalk matrix.

7. The three-channel fluorescence localization super-resolution biological microscope system according to claim 1, wherein the three-channel fluorescence localization super-resolution biological microscope system adopts the fluorescent molecules of different excitation wavelengths to perform tri-color labeling for the biological sample, and the biological sample is immersed in an imaging buffer solution; and the used three kinds of fluorescent molecules are fluorescent molecules having light switching properties and corresponding to laser with a wavelength of 500 nm to 600 nm, laser with the wavelength of 600 nm to 700 nm and the laser with the wavelength of 700 nm to 760 nm.

8. The three-channel fluorescence localization super-resolution biological microscope system according to claim 7, wherein the used three types of fluorescent molecules are CF568 or Cy3B, Alexa 647 or Cy5, and Alexa750 or Cy7; the laser illuminates the biological sample to respectively generate a first channel glittering fluorescent signal corresponding to the Alexa647 or Cy5 fluorescent molecules, a second channel glittering fluorescent signal corresponding to the Alexa750 or Cy7 fluorescent molecules and a third channel glittering fluorescent signal corresponding to the CF568 or Cy3B fluorescent molecules; the imaging buffer solution comprises TCEP cyclooctatetraene, deoxidant, methyl viologen and/or ascorbic acid; and the deoxidant comprises a combination of glucose oxidase, glucose and catalase or comprises a combination of pyranose oxidase, glucose and catalase.

9. A microscope method of the three-channel fluorescence localization super-resolution biological microscope system of any one of claim 1, comprising the following steps:
   after passing through a first collimating lens, a second multicolor reflector and an illumination lens, laser excited by a first channel and a second channel in the illumination module is reflected by the first multicolor reflector to illuminate a sample through an objective lens; after passing through a second collimating lens, a reflector, the second multicolor reflector and the illumination lens, the laser excited by the third channel in the illumination module is reflected by the first multicolor reflector to illuminate the sample through the objective lens;
   the three-dimensional nanoscale sample locking module is used to lock cells in real time, which comprises the following steps:
   step I: the three-dimensional nanoscale sample locking module utilizes a light emitting diode to generate blue light to provide light-field illumination to the sample through a Kohler illumination optical path;

step II: light received by an objective lens from the sample is allocated by an allocation light splitter, and one part of the light is imaged at a locking camera through a front imaging lens;

step III: when a program of the computer is started, the program may capture a real-time image from the locking camera;

step IV: the program may calculate a local contrast of the image in real time, and select an optimum area so as to use the area having a maximum sum of the local contrast as a position of the optimum area;

step V: when the locking is begun, the locking program may control a piezoelectric ceramic platform through a piezoelectric ceramic platform drive to longitudinally scan a focal plane up and down; and during the scanning, a calibration image sequence is captured from the locking camera and the corresponding z value is recorded;

step VI: the locking program intercepts a fixed-sized area from the uppermost or lowermost image of the calibration image sequence at the optimum area position as a reference image;

step VII: a spatial correlation matrix is solved for the sequence image and the reference image, and the Gaussian fitting is carried out for the spatial correlation matrix;

step VIII: a monotone decrease correspondence between a fitting peak value and the z value is solved, and a multi-time function is used for approximate fitting;

step IX: the locking program then captures a light-field image of the sample in real time from the locking camera;

step X: the spatial correlation matrix is solved for the real-time image and the reference image and is subjected to the Gaussian fitting, a center is solved as an offset on an xy plane, and a real-time z value is solved by fitting the limit value;

step XI: the locking program then drives the piezoelectric ceramic platform to compensate the offset through a drive circuit; and step XII: step VIII and step X are repeated until the locking is ended;

the fluorescent light generated by exciting fluorescent dyes labeling the sample structure with the laser is collected by the objective lens and proportioned by the allocation light splitter; one part enters the fluorescent simultaneous imaging optical paths of the three channels of the imaging module, an imaging range of the fluorescent light reaching the imaging module is firstly adjusted by the rectangular diaphragm, and the fluorescent light is collimated by the imaging collimating lens to become parallel light; the fluorescent light is formed by combining the fluorescent light of the three channels at the time; the first two-color reflector, the second two-color reflector and the third two-color reflector allocate different bands of fluorescent light generated by the first channel, the second channel and the third channel into three different optical paths; the optical path of each channel has one filter, comprising the first filter in the first optical path, the second filter in the second optical path and the third filter in the third optical path; the first filter, the second filter and the third filter are used to filter the excited light in the channels; the direction of the remaining fluorescent light is adjusted by the reflector group; finally, the fluorescent light of the three channels is imaged onto different positions of the detector chip through the rear imaging lens; in order to further eliminate the impact of the inter-channel crosstalk on the imaging effect, a crosstalk removal algorithm is used to optimize an imaging result; the fluorescence imaging of each fluorescent dye on the three channels is measured, and the brightness on each channel is averaged to obtain a crosstalk ratio of the fluorescent dye on each channel; since the amount of the light emitted by the fluorescent dye is equal to the sum of the light amount received by each channel, the crosstalk ratio on each channel is normalized to obtain a light splitting ratio of the fluorescent dye on each channel; the crosstalk ratio of each single fluorescent dye is used as a column vector to be combined into a matrix, which is a crosstalk matrix of the fluorescence microscope system; an inverse matrix of the crosstalk matrix is the crosstalk-removed matrix; the images of each channel are lined into the column vector, and the crosstalk-removed matrix is used to act on the column vector formed by lining the images of each channel to obtain the crosstalk-removed image; and the sequence of each channel corresponds to the sequence of each column of the crosstalk matrix.

* * * * *